United States Patent
Chen et al.

(10) Patent No.: US 11,093,356 B2
(45) Date of Patent: *Aug. 17, 2021

(54) AUTOMATED SELF-HEALING DATABASE SYSTEM AND METHOD FOR IMPLEMENTING THE SAME

(71) Applicant: salesforce.com, inc., San Francisco, CA (US)

(72) Inventors: Bohan Chen, Redwood City, CA (US); Donald Tam, Hillsborough, CA (US); Jesse Collins, San Francisco, CA (US); Sheng Qiao, Fairfax, VA (US); Ted Liu, Los Altos, CA (US); Youngjin Yu, Cupertino, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/440,104

(22) Filed: Jun. 13, 2019

(65) Prior Publication Data

US 2019/0294512 A1 Sep. 26, 2019

Related U.S. Application Data

(63) Continuation of application No. 15/440,810, filed on Feb. 23, 2017, now Pat. No. 10,409,697.

(51) Int. Cl.
G06F 11/20 (2006.01)
G06F 16/27 (2019.01)
(Continued)

(52) U.S. Cl.
CPC ........ *G06F 11/203* (2013.01); *G06F 11/1666* (2013.01); *G06F 11/2094* (2013.01);
(Continued)

(58) Field of Classification Search
CPC .. G06F 11/1666; G06F 11/2094; G06F 16/27; G06F 16/2308; G06F 2201/80;
(Continued)

(56) References Cited

U.S. PATENT DOCUMENTS 5,577,188 A 11/1996 Zhu
5,608,872 A 3/1997 Schwartz et al.
(Continued)

*Primary Examiner* — Yolanda L Wilson
(74) *Attorney, Agent, or Firm* — LKGlobal | Lorenz & Kopf, LLP

(57) ABSTRACT

An automated self-healing database system is provided that includes a primary database, an application server that writes data to the primary database and reads data from the primary database when it is available, a standby database that is a replica of the primary database, and a self-healing module (SHM). The SHM can automatically detect unavailability of the primary database, and if the standby database is available, the SHM can automatically enable the standby database as readable and writable, assign the standby database the role of primary database at the primary site to start replicating data to other standby databases, and use a pre-established connection between the application server and the standby database to allow the application server to read data from the standby database and to write data to the standby database resulting in the standby database assuming role of the primary database at the primary site.

20 Claims, 13 Drawing Sheets

(51) Int. Cl.
*G06F 16/23* (2019.01)
*G06F 11/16* (2006.01)

(52) U.S. Cl.
CPC .......... *G06F 16/2308* (2019.01); *G06F 16/27* (2019.01); *G06F 2201/80* (2013.01); *G06F 2201/805* (2013.01); *G06F 2201/82* (2013.01)

(58) Field of Classification Search
CPC ........... G06F 2201/805; G06F 2201/82; G06F 11/203; G06F 11/2023; G06F 17/30575
See application file for complete search history.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven, et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,677,088 B1 | 3/2014 | Patil |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0158862 A1 | 8/2003 | Eshel et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0162836 A1* | 8/2004 | Aronoff ................ H04L 29/06 |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2007/0185912 A1* | 8/2007 | Gupta ................ G06F 16/2462 |

(56) References Cited

U.S. PATENT DOCUMENTS

| | | |
|---|---|---|
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2009/0201799 A1* | 8/2009 | Lundstrom .............. H04L 41/06 370/217 |
| 2010/0257399 A1* | 10/2010 | Brown ................ H04L 67/1095 714/4.1 |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0006932 A1 | 1/2013 | Akulavenkatavara et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2013/0332770 A1* | 12/2013 | Thiel ................... G06F 11/2094 714/15 |
| 2014/0068584 A1 | 3/2014 | Kundu et al. |
| 2014/0136878 A1 | 5/2014 | Ananthanarayanan et al. |
| 2015/0074060 A1 | 3/2015 | Varadharajan et al. |
| 2015/0222515 A1 | 8/2015 | Ishii et al. |
| 2016/0188427 A1 | 6/2016 | Chablani et al. |
| 2016/0239350 A1* | 8/2016 | Kamawat ............... G06F 9/5088 |
| 2017/0339158 A1 | 11/2017 | Khalid et al. |
| 2018/0268017 A1 | 9/2018 | Parikh et al. |
| 2020/0026786 A1 | 1/2020 | Bourbonnais et al. |
| 2020/0034458 A1 | 1/2020 | Bilbrey et al. |

\* cited by examiner

AUTOMATED SELF-HEALING DATABASE SYSTEM AND METHOD FOR IMPLEMENTING THE SAME

CROSS-REFERENCE TO RELATED APPLICATION

This application is a continuation of U.S. application Ser. No. 15/440,810 filed Feb. 23, 2017, which is incorporated herein by reference in its entirety.

TECHNICAL FIELD

Embodiments of the subject matter described herein relate generally to cloud-based computing. More particularly, embodiments of the subject matter relate to automated self-healing database system and method for implementing the same in a cloud-based computing environment.

BACKGROUND

Today many enterprises now use cloud-based computing platforms that allow services and data to be accessed over the Internet (or via other networks). Infrastructure providers of these cloud-based computing platforms offer network-based processing systems that often support multiple enterprises (or tenants) using common computer hardware and data storage. This "cloud" computing model allows applications to be provided over a platform "as a service" supplied by the infrastructure provider.

High availability (HA) database architectures prevent downtime and data loss by using redundant systems and software to eliminate single points of failure. Administrator error, data corruption caused by system or software faults, or complete site failure can impact the availability of a database. The only way to prevent being impacted by single points of failure is to have a completely independent copy of a production database already running on a different system and ideally deployed at a second location, which can be quickly accessed if the production database becomes unavailable for any reason.

Oracle Data Guard forms an extension to the Oracle relational database management system (RDBMS). In Oracle's Data Guard system, a database operates in one of the following mutually exclusive roles: primary or standby. Oracle Data Guard technology can help eliminate single points of failure, and prevents data loss and downtime in a simple yet economical manner by maintaining a synchronized physical replica of a production or primary database at a remote location. Oracle Data Guard maintains these standby databases as copies of the production database. Then, if the production database becomes unavailable because of a planned or an unplanned outage, Oracle Data Guard can switch any standby database to the production role, minimizing the downtime associated with the outage.

Data Guard enables a database administrator to change these roles dynamically by issuing the SQL statements, or by using either of the Data Guard broker's interfaces. One limitation of Data Guard technology is that it does not guarantee the automatic provisioning of a new standby database after a role change when primary database is not available due to various types of failures, such as hardware failures on the primary database server or storage subsystem.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
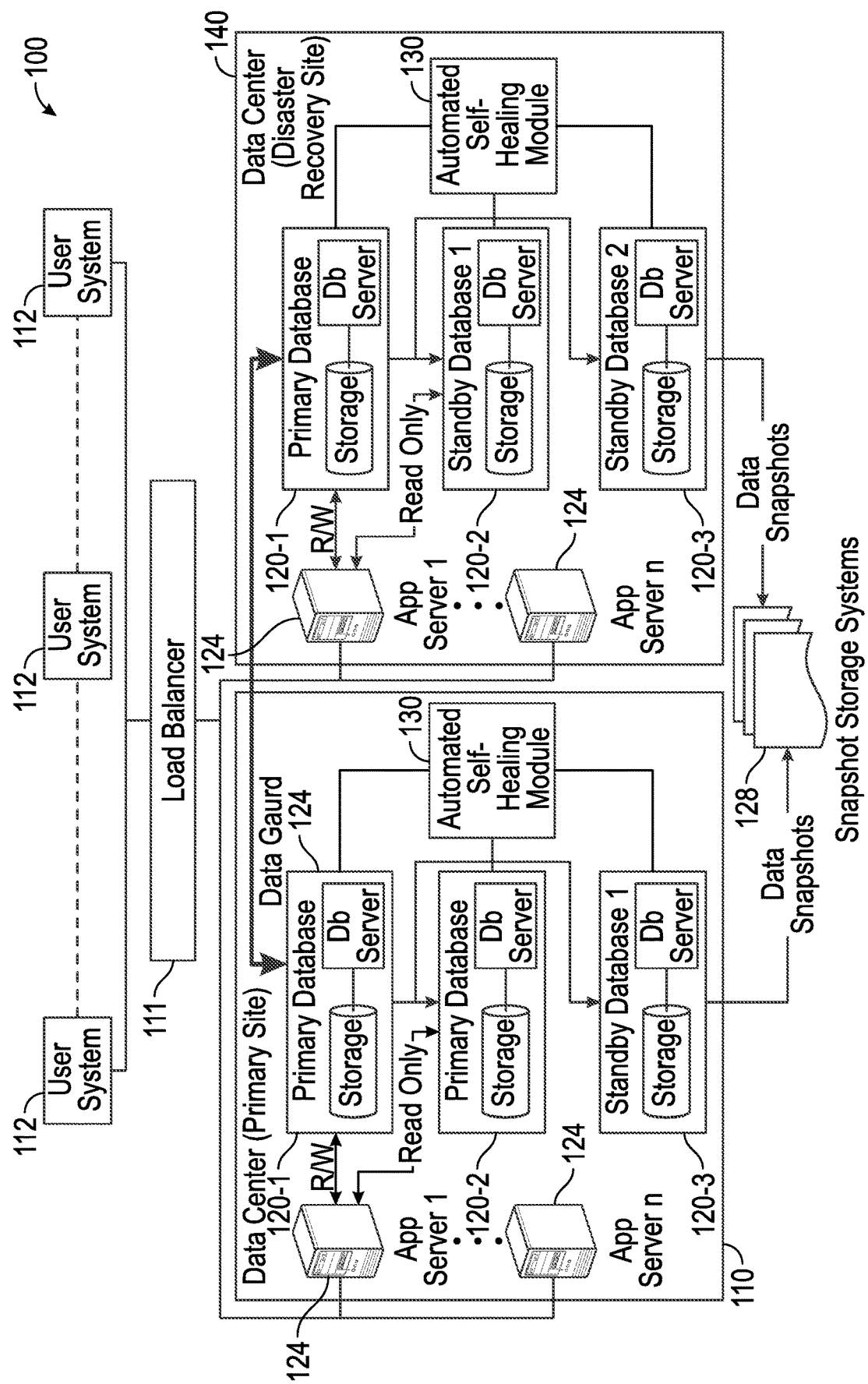
FIG. 1 is a block diagram that illustrates an automated self-healing database system having an automated self-healing module in accordance with the disclosed embodiments.

The exemplary embodiments presented here relate to self-healing automated database systems, methods, procedures, and technology that can be implemented in a cloud-based computing environment. For example, the described subject matter can be implemented in the context of any cloud-based computing environment including, for example, a multi-tenant database system.

To address the issues discussed above, an automated self-healing database system and related methods are provided. The automated self-healing database system includes a primary site (or data center) that includes a primary database, one or multiple standby databases that are each a replica of the primary database, and a self-healing module. The self-healing module is a custom application that can monitor and manage configurations of the automated self-healing database system. The self-healing module can interact with vendors' technologies via the vendors' API. Examples of such technologies include Oracle™ Data Guard replication and failover technologies, Amazon Web Services (AWS)™ snapshot technologies, etc. The self-healing module can automatically detect unavailability (e.g., failure of hardware and/or software) of the primary database, and determine if a standby database of the primary site, that is a replica of the primary database, is available. If so, the self-healing module can automatically initiate a failover processing sequence that includes automatically assigning the standby database the role as the primary database at the primary site to recover functionalities and capacity of the primary database. By providing automatic failover and API to provision a standby database when a primary database failure happens, self-healing can be achieved.

For example, in one implementation, when the primary database becomes unavailable (e.g., fails, crashes, etc.), a self-healing module automatically detects unavailability, and optionally provides read-only capability by enabling read-only application mode at a standby database, and routing traffic of the applications served by application servers (at the primary site) to this read-only standby database to improve the customer experience. If the primary database does not recover/restart is a pre-defined and configurable time period (e.g., 10 minutes), the role of primary database will be automatically failed over to a standby database such that the standby database becomes the new primary database. This can be done by enabling the standby database, a replica of the primary database, as readable and writable and assigning it as the primary role to start replicating data to other standby databases. For efficiency, the applications can pre-establish connections to both the primary and standby databases so that no new connection establishment is needed when a role transition happens. In addition, further enhancement can be done if the storage sub-system of the original primary database is still available and is in a consistent state. For example, by detaching the storage sub-system from the failed primary database server and attaching it to the database server of the standby database; this can help reduce any data loss.

In addition, the system can automatically provision a new standby database to bring the system back to its full capacity without manual intervention. As part of the failover processing sequence, a new database can be automatically created using the most recent snapshot data that is stored at snapshot storage systems and automatically added as a standby database of the primary site so that the system is restored to its full capacity including high availability and standby capacity. In some implementations, when/if the original primary database that failed has recovered it can then be re-provisioned as a standby database.

FIG. 1 is a block diagram that illustrates an automated self-healing database system 100 having an automated self-healing module 130 in accordance with the disclosed embodiments. In one embodiment, the automated self-healing database system 100 is a cloud-based database system The automated self-healing database system 100 includes a number of user system 112, a load balancer 111 that controls the routing of the user system 112 traffic to applications servers 124 in a primary site 110 (or data center) or in a secondary site 140, that serves as a disaster recovery site, and a snapshot storage system 128.

The primary site 110 site (or data center) includes a number (n) of application servers 124, wherein n is greater than or equal to one, a primary database 120-1, and standby databases 120-2 and 120-3. In this particular implementation, the primary site 110 has two standby databases, but fewer or more standby databases can be included depending on the particular implementation. As illustrated, each database 120 includes a database server that performs various database computing processes, joins, sorting, queries, or transactions and a storage sub-system which includes storage management software and hardware that stores transactional data. The database server can read data from the storage sub-system, and write data to the storage sub-system. Together, the storage sub-system and the database server (including its software components or modules) provide the capability for processing and storing data (or transactions) that can be queried, updated and deleted via query languages and other interfaces. Although not illustrated, the site can include other hardware. In this regard, as used herein, a "site" or "data center" can refer to a facility that hosts physical hardware with separate power supply and network connectivity. A site is usually physically separated from sites by some physical distance (e.g., from tens to thousands of miles apart).

A Data Guard configuration includes one production database that functions in the primary role, also referred to herein as the primary database 120-1. This is the database that is accessed by applications that are executed by the application servers 124. The user systems 112 interact with applications executed at the application servers 124. In response, the applications executed at the application servers 124 communicate read and write (R/W) requests to a primary database 120-1 of the primary site 110. For example, the applications 124 can write data to store it at the primary database 120-1, and can access data at the primary database 120-1 by reading it from the primary database 120-1 when the primary database 120-1 is available and operating normally (e.g., is not experience a failure or other cause of unavailability). This read/write transaction capability is represented by the arrow between the application server 124 and primary database 120-1 that is labelled R/W in FIG. 1. Depending on the implementation, the primary database 120-1 can be either a single-instance Oracle database or an Oracle Real Application Clusters database.

Each standby database 120-2, 120-3 is an independent copy of the primary (or production) database 120-1 that can be used for disaster protection in a high availability environment. In other words, each standby database 120-2, 120-3 is a transactionally consistent or "backup" copy of the primary database 120-1. The standby databases 120-2, 120-3 receive data replicated from the primary database 120-1 synchronous or asynchronously when a transaction is committed and stored at the primary database 120-1. This is illustrated in FIG. 1 by the unlabeled, double-ended arrows extending between the primary database 120-1 and the standby database 120-2, and between the primary database 120-1 and the standby database 120-3, and between the primary database 120-1 at the primary site 110 and the primary database 120-1 at the disaster recovery site 140. For example, once the standby databases 120-2, 120-3 are created and incorporated into a Data Guard configuration, each standby database 120-2, 120-3 is automatically maintained by transmitting redo data from the primary database 120-1 and then applying the redo to the standby database. In some implementations, the standby database can be either a single-instance Oracle database or an Oracle Real Application Clusters (RAC) database (as is the case with the primary database 120-1).

As will be explained below in certain situations, when a read-only application mode is enabled, the applications 124 may have read-only access to data stored at the standby database 120-2 meaning that applications executed at the application servers 124 may communicate read-only requests to the standby database 120-2 such that they can only read data from the standby database 120-2, but not write data to the standby database 120-2. This read-only capability is represented in FIG. 1 by the double-ended arrow extending between the primary database 120-1 and the standby database 120-2 that is labeled "Read Only." The applications 124 do not normally have access to the backup standby database 120-3 since it's purpose is to serve as a backup that can be used to create a new database or update an existing database in the event it is temporarily unavailable. The purpose of having a dedicated standby database 120-3 for snapshot backup is to separate the user system workload and requests from the backend snapshot operations. This is an optimization for performance stability and operations, not a limitation.

In general terms, the disaster recovery site 140 is a facility an organization can use to recover and restore its technology infrastructure and operations when its entire primary site 110 (or primary data center) becomes unavailable or fails. In this regard, the disaster recovery site 140 is a symmetric version of the primary site 110 that operates the same as the primary site 110, and may include all of same elements that are part of the primary site 110 depending on the implementation. As such, in this particular implementation, the disaster recovery site 140 includes a primary database 120-1, standby databases 120-2, 120-3, and application servers 124 that are identical to those implemented at the primary site 110. In most implementations, the secondary or disaster recovery site 140 is normally located some distance away from the primary site 110 so that the sites are not located close to each other. This way, if some unforeseen disaster (e.g., a natural calamity or a man-made disaster) strikes the primary site 110, the secondary site 140 will most likely not be affected, and should be able to start running so that there is no business disruption.

The snapshot storage system 128 that can be implemented either at the primary site 110 and at the secondary site 140, or remotely at another location so that it is not located in physical proximity with the primary site 110 and/or the disaster recovery site 140. For example, in accordance with some of the disclosed embodiments, the snapshot storage systems 128 are separate storage hardware that is not implemented at the primary site 110, and is remotely located to guard against primary site level failures. As will be explained below, snapshot application and management module (not illustrated in FIG. 1) executes to regularly or periodically to capture snapshots of data stored at the standby database 120-3, and stores the snapshots of data at a snapshot storage system 128. The snapshot storage systems 128 can be accessed by the primary site 110 or the DR site 140 such that the snapshot data is available almost instantaneously. The snapshot data can be used for data restore or for provisioning standby databases in the case of failover.

In some cases, the primary database 120-1 at primary site 110 can become unavailable for some reason. For example, the primary database 120-1 can become unavailable for a number of different reasons including, but not limited to, a power outage, a hardware failure, a software failure, a network failure, or an operator error, etc.

To address this issue, the disclosed embodiments can provide an automated self-healing module 130 at each site 110, 140. As will be explained in greater detail below, the automated self-healing module 130 can automatically detect unavailability and/or failure of the primary database 120-1 at the primary site 110, and if the primary database 120-1 in unable to recover within a time period and the standby database 120-2 of the primary site 110 is available, the automated self-healing module 130 can automatically initiate a failover processing sequence. Failover is an operational mode in which the role of the primary database 120-1 is automatically switched to and assumed by the standby database 120-2 at the primary site 110 when the primary database 120-1 becomes unavailable (e.g., due to failure, scheduled unavailability, etc.). A storage subsystem of the primary database 120-1, if intact and accessible, can be automatically attached to a database server of the standby database 120-2 for recovery to further reduce any potential data loss. By automatically attaching the storage subsystem of the primary database 120-1 to the database server of the standby database 120-2 before enabling the standby database 120-2 as readable and writable data loss can be avoided that might otherwise occur due to some transactions on the primary database 120-1 just before the primary database 120-1 failure might not be replicated to the standby database 120-2 in time. After automatically attaching the storage subsystem of the primary database 120-1 to the database server of the standby database 120-2, the standby database 120-2 can then be automatically enabled as readable and writable, and then assigned the role of primary database at the primary site 100 to start replicating data to other standby databases.

In other words, as part of the failover, the self-healing module 130 can automatically and seamlessly assign the primary role to the standby database 120-2 so that it functions as the primary database of the primary site 110. As such, when the primary database 120-1 fails (or otherwise becomes unavailable), one of the standby databases can be automatically assigned to serve as the primary database. This way the applications served by application servers 124 still have full access to this "new" primary database including permission to perform read/write transactions (e.g., read data from and write data to the standby database that has been assigned the role as the new primary database). After a failover role transition, pre-established connections between the application servers and the standby database 120-2 are used to allow the application servers to read data from the standby database 120-2 and to write data to the standby database 120-2 resulting in the standby database 120-2 assuming role of the primary database at the primary site 110. In addition, as will be explained in greater detail below, a new standby can be provisioned, using the latest snapshot, and then add back to the replication configuration to restore the primary site back to its full capacity including high availability and standby capacity.

Figure 2:
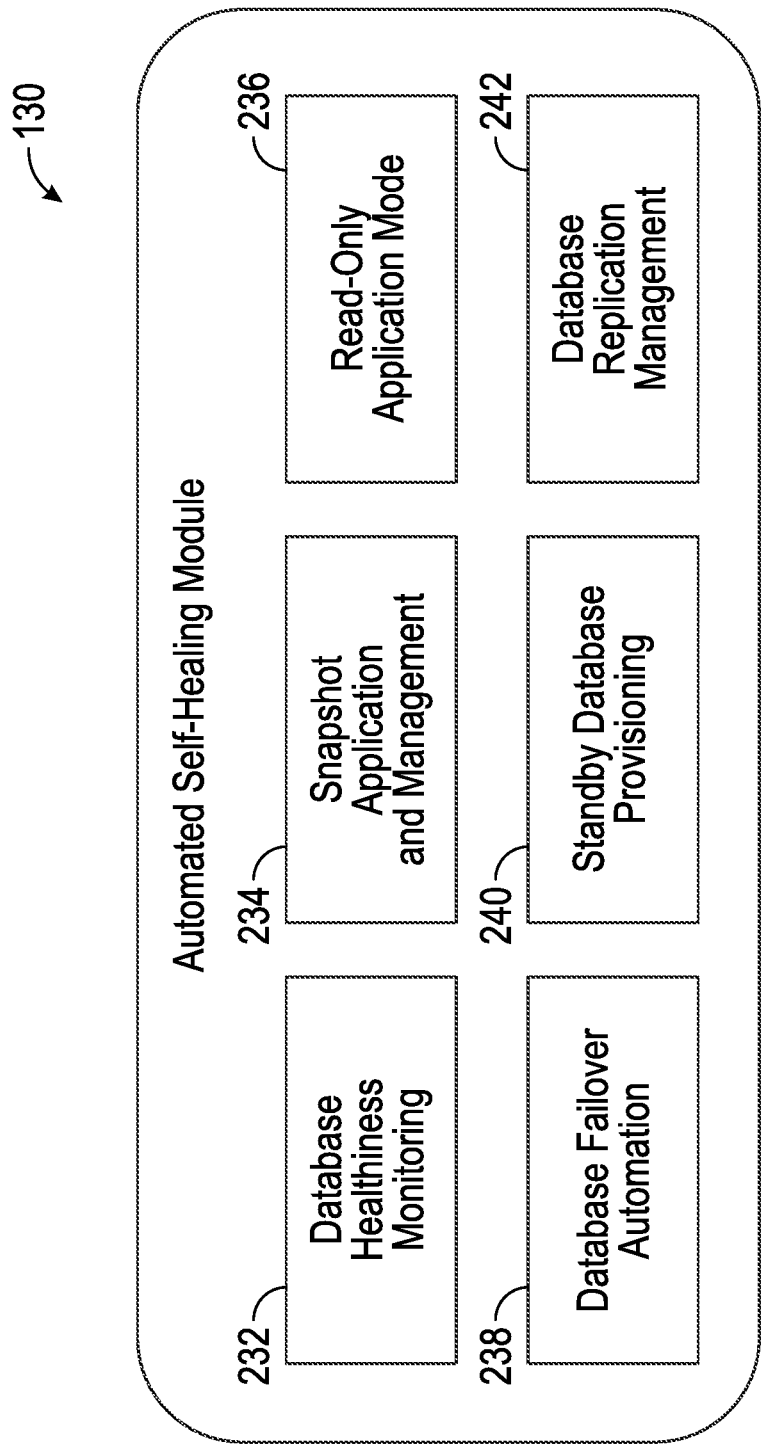
FIG. 2 shows a block diagram of various modules of an automated self-healing module in accordance with the disclosed embodiments.

FIG. 2 shows a block diagram of various modules of an automated self-healing module 130 in accordance with the disclosed embodiments. FIG. 2 illustrates various modules of the automated self-healing module 130 including a database health monitoring module 232, a snapshot application and management module 234, a read-only-application mode module 236, a database failover module 238, a standby database provisioning module 240, and a database replication management module 242.

Various tasks and operations performed by the various elements in FIGS. 1 and 2 will be described in greater detail below with reference to FIGS. 3A-7. For example, certain tasks and operations performed at the primary site 110, including tasks and operations performed by various modules of the automated self-healing module 130 shown in FIG. 2, as well as tasks and operations performed at the disaster recovery site 140 will now be described below with reference to FIGS. 3A-7 and with continued reference to FIGS. 1 and 2.

Figure 3A:
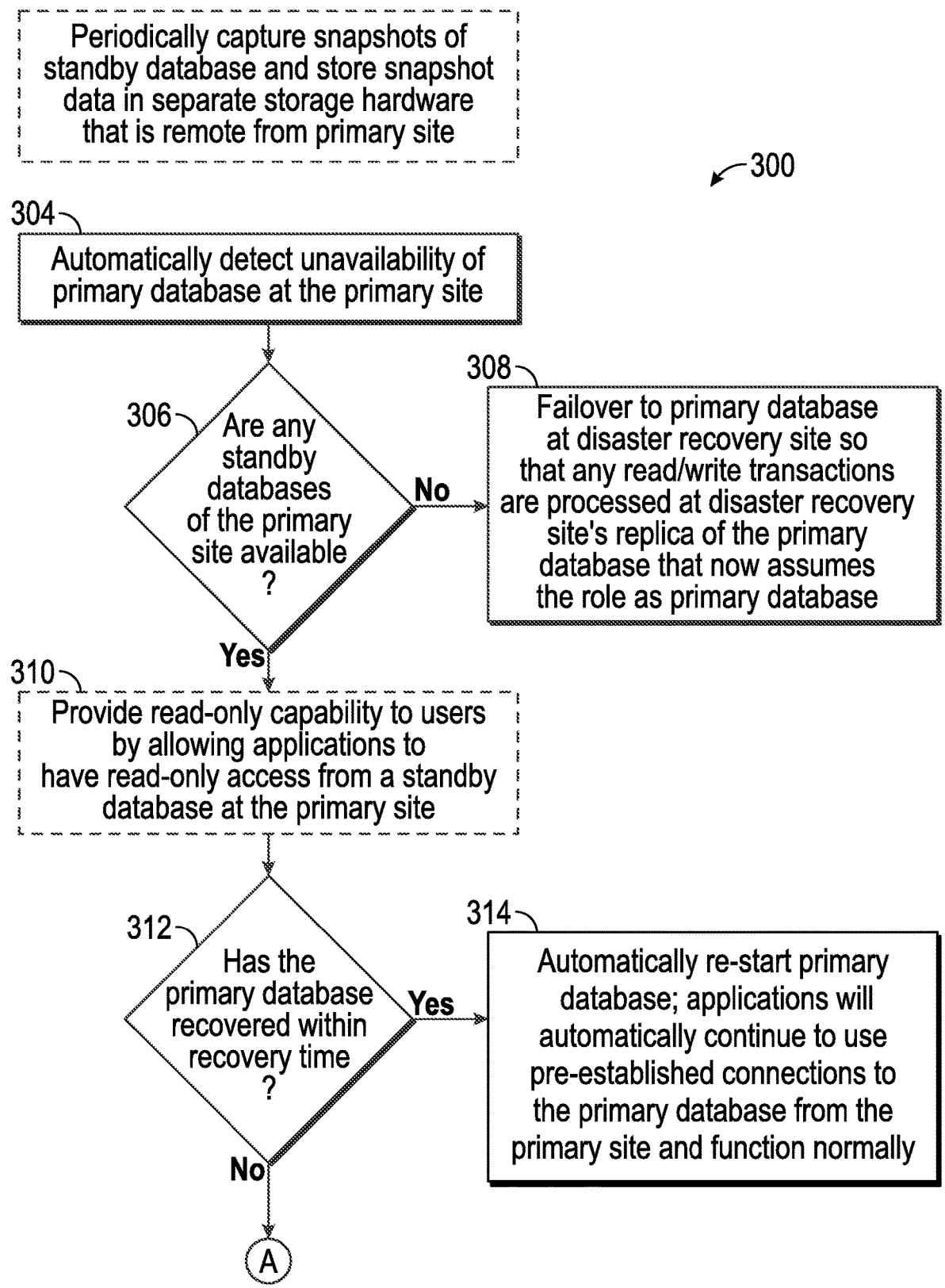
FIGS. 3A and 3B are collectively a flow chart that illustrates an exemplary method for providing an automated self-healing database system in accordance with the disclosed embodiments.
Figure 3B:
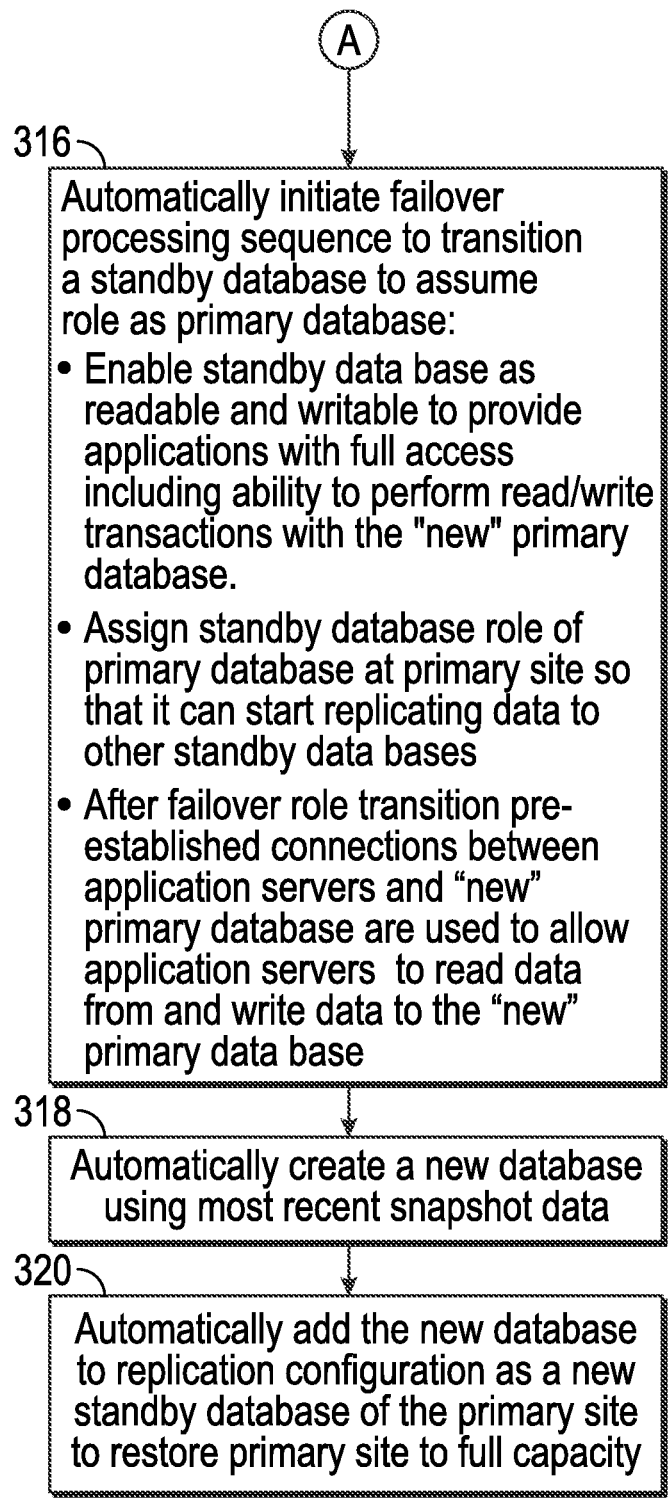

FIGS. 3A and 3B are collectively is a flow chart that illustrates an exemplary method 300 for providing an automated self-healing database system in accordance with the disclosed embodiments. As a preliminary matter, it should be understood that steps of the method 300 are not necessarily limiting, and that steps can be added, omitted, and/or performed simultaneously without departing from the scope of the appended claims. It should be appreciated that the method 300 may include any number of additional or alternative tasks, that the tasks shown in FIGS. 3A and 3B need not be performed in the illustrated order, and that the method 300 may be incorporated into a more comprehensive procedure or process having additional functionality not described in detail herein. Moreover, one or more of the tasks shown in FIGS. 3A and 3B could potentially be omitted from an embodiment of the method 300 as long as the intended overall functionality remains intact. It should also be understood that the illustrated method 300 can be stopped at any time. The method 300 is computer-implemented in that various tasks or steps that are performed in connection with the method 300 may be performed by software, hardware, firmware, or any combination thereof. For illustrative purposes, the following description of the method 300 may refer to elements mentioned above in connection with FIGS. 1 and 2. In certain embodiments, some or all steps of this process, and/or substantially equivalent steps, are performed by execution of processor-readable instructions stored or included on a processor-readable medium.

FIGS. 3A and 3B will be described with reference to FIGS. 4-7, which are block diagrams that illustrate operation of the automated self-healing of the database system 100 after the primary database 120-1 fails and is unable to recover, and in particular, how the automated self-healing module 130 functions to achieve self-healing capability at the primary site. In the description of FIGS. 3A-7 that follows, the automated self-healing module 130 will be described as performing various acts, tasks or steps, but it should be appreciated that this refers to processing system(s) of these entities executing instructions to perform those various acts, tasks or steps. Depending on the implementation, some of the processing system(s) can be centrally located, or distributed among a number of systems that work together.

Referring again to FIG. 3A, it is noted that prior to the start of and during the method 300, the snapshot application and management module 234 executes in the background to regularly or periodically capture snapshots of data stored at standby database 120-3, and stores the snapshots of data in at the snapshot storage systems 128. For instance, in one implementation, the snapshot application and management module 234 can take an hourly snapshot of the standby database 120-3 and store the snapshot data in the snapshot storage systems 128. The snapshot data is then available to be used for data restoration or for provisioning standby databases in the case of failover. Further, the hourly snapshots can be merged into daily snapshots after a certain number of hours have passed and stored for a number of days per a data retention policy. These tasks that are performed by the snapshot application and management module 234 are represented in FIG. 3A by an unnumbered block since they take place outside the method 300 that is illustrated by the numbered blocks of FIGS. 3A and 3B.

Figure 4:
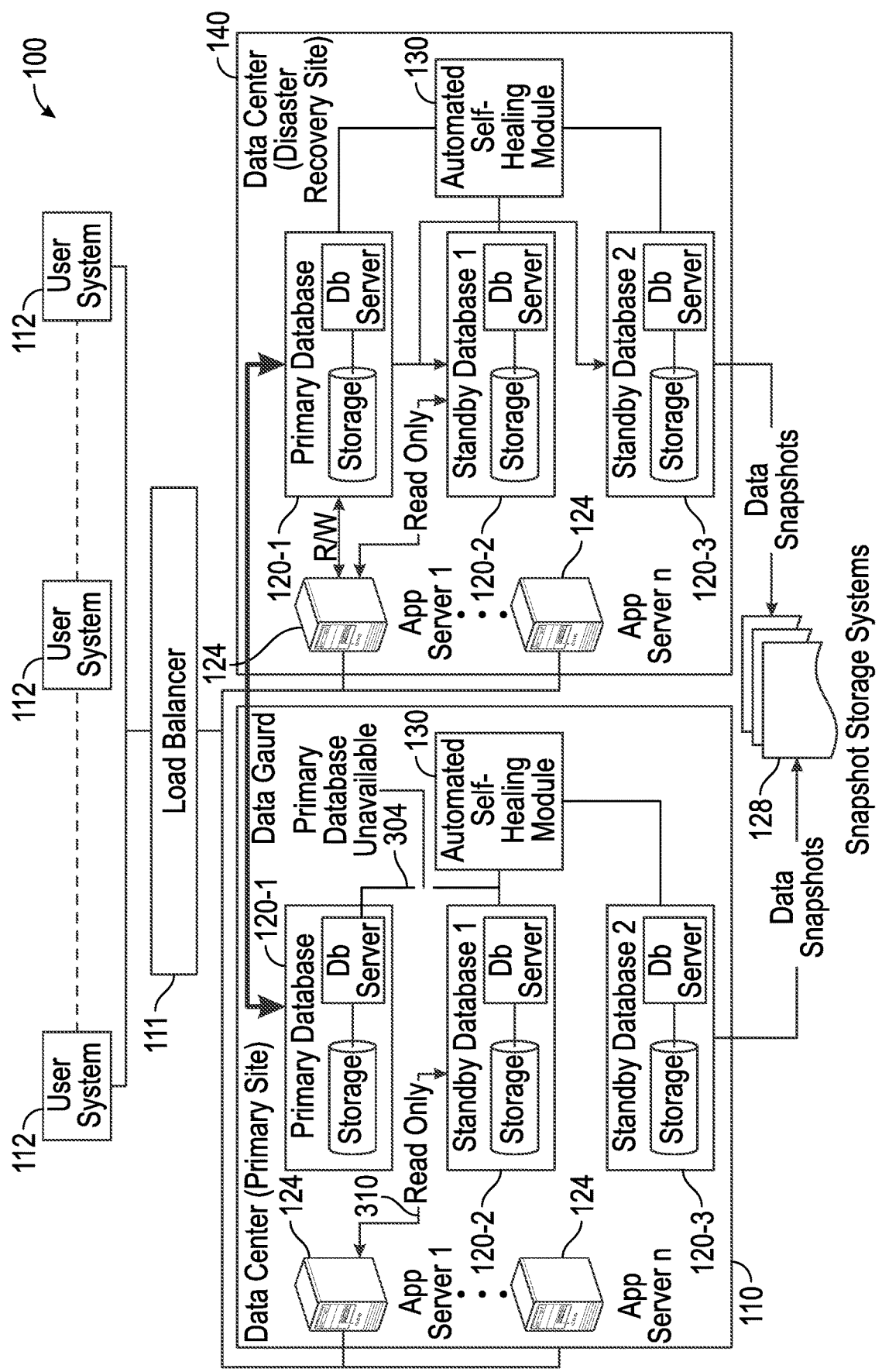
FIGS. 4-7 are block diagrams that illustrate an automated self-healing database system and how it functions to achieve self-healing capability in accordance with the disclosed embodiments.

The method 300 of FIGS. 3A and 3B begins at 304, where the database health monitoring module 232 (FIG. 2) automatically detects unavailability of the primary database 120-1 at primary site 110, as shown at 304 of FIG. 4. For example, in one embodiment, the database health monitoring module 232 (FIG. 2) automatically detects unavailability or failure of the primary database 120-1 at primary site 110 by sending heartbeat to the primary database server and health check query and transactions to the primary database 120-1. For example, in one implementation, heartbeat messages can be sent to network and operating systems of the primary database server, for instance, using a "ping" utility that is available in Unix or Linux. If the heartbeat to the primary database server fails to respond, or the health check query and transactions fail to complete, the database health monitoring module 232 can determine if the primary database 120-1 is not available and needs restart or recover.

At 304, the database health monitoring module 232 (FIG. 2) can also start a recovery timer/counter that is used to track unavailability of the primary database 120-1 (e.g., how long the primary database 120-1 has been unavailable for). As will be explained below, when the primary database 120-1 is determined to be unavailable for a time/count that exceeds the recovery timer/counter, then it is assumed that the primary database 120-1 will not recover, this will trigger failover to transition the primary role to either (1) a standby database 120-2 at the primary site 110 if it is available, or (2) to another primary database 120-1 at the DR site 140.

At 306, the database health monitoring module 232 (FIG. 2) can determine if any of the standby databases of the primary site are available (e.g., is this a site level failure where the primary and all of the standby databases of the primary site are unavailable, or is this a partial failure where the primary database has become unavailable, but at least one standby database at the primary site is available).

When the database health monitoring module 232 (FIG. 2) determines (at 306) that all of the databases of the primary site 110 are unavailable (e.g., have failed), the method 300 proceeds to 308, where database failover module 238 (FIG. 2) performs failover to the primary database 120-1 at the disaster recovery site 140 (also referred to as a site-switching operation) and instructs the load balancer 111 to direct all network traffic to disaster recovery site 140 (e.g., to direct all traffic to the primary database 120-1 of the disaster recovery site 140 if available). As a result, any read/write requests from the user system 112 will be handled by the application servers 124 and the primary database 120-1 at the disaster recovery site 140.

Block 310 is illustrated in a dashed-line box since it is optional. When the database health monitoring module 232 (FIG. 2) determines (at 306) that the standby database 120-2 of the primary site 110 is available (e.g., has not failed), the method 300 may optionally proceed to 310, where the read-only-application mode module 236 (FIG. 2) can enable read-only app mode at the standby database 120-2 to temporarily allow the applications served by application servers 124 to have read-only access to data stored at the standby database 120-2 at the primary site 110. This is illustrated in FIG. 4 by the line 310 between the application servers 124 and the standby database 120-2. Allowing read-only access is beneficial for improved customer experience because while transactions cannot be committed, the application servers 124 can still read data from the standby database 120-2 and satisfy customer query and other read-only requests while the primary database 120-1 is down and while it is being determined whether the primary database 120-1 will recover (and thus whether a role transition should take place). In some cases, when the primary database 120-1 can recover within a relatively short time period, then it will make more sense to wait so that the primary database 120-1 keeps its role as the primary database for the primary site 110.

At 312, the database health monitoring module 232 (FIG. 2) determines whether the primary database 120-1 has been unavailable for a time/count that exceeds the recovery timer/counter. When the database health monitoring module 232 (FIG. 2) determines (at 312) that the primary database 120-1 is available and has recovered prior to the recovery timer/counter reaching a certain recovery time/count, this means that the primary database 120-1 has recovered within the recovery time/count, and the method proceeds to 314, where database health monitoring module 232 (FIG. 2)

automatically re-starts primary database 120-1 (e.g., by the operating system's daemon/watchdog process), and the primary database 120-1 will continue to be used as the primary database 120-1 of the primary site 110. Applications at the application servers 124 will continue to use the pre-established connections to the primary database 120-1 of the primary site 110 and will continue to function normally.

Figure 5:
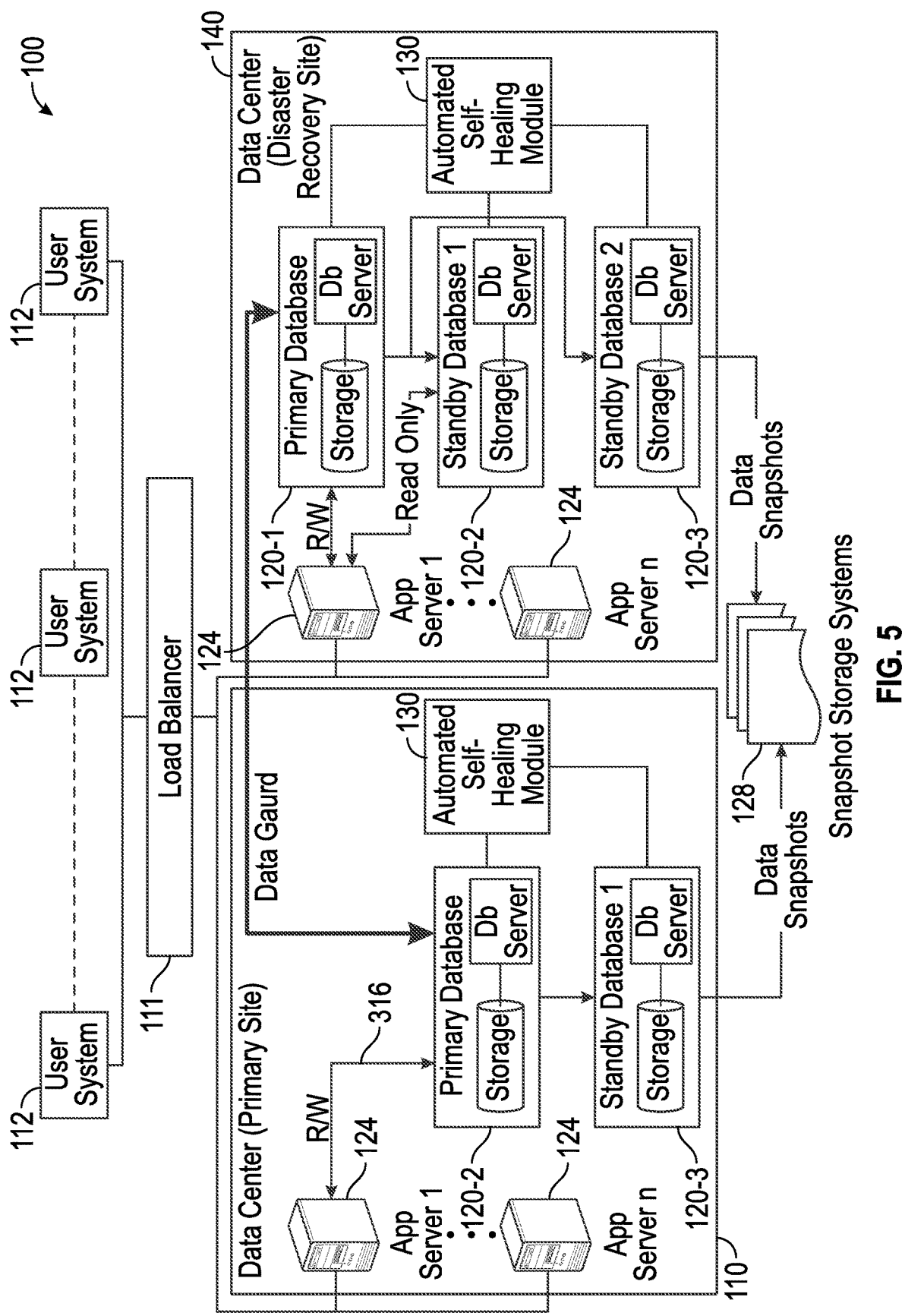

By contrast, when the database health monitoring module 232 (FIG. 2) determines that the primary database 120-1 has been unavailable for a time/count that exceeds the recovery timer/counter, this means that the primary database 120-1 has not recovered within the recovery time/count, and the method proceeds to 316, where the database failover module 238 (FIG. 2) triggers a failover to switch the standby database 120-2 into a new role of as the primary database of the primary site 110, as shown in FIG. 5. In one embodiment, this can be done, for example by automatically attaching storage subsystem of the primary database 120-1, if intact and accessible, to the database server of the standby database 120-2 for recovery purposes; this can help reduce any data loss and eliminate delay of allocating a new host. The standby database 120-2 can then be automatically enabled as readable and writable, and assigned the role of primary database at the primary site 100 to start replicating data to other standby databases. After a failover role transition, pre-established connections between the application servers and the standby database 120-2 are used to allow the application servers to read data from the standby database 120-2 and to write data to the standby database 120-2 resulting in the standby database 120-2 assuming role of the primary database at the primary site 110. In accordance with the disclosed embodiments, for efficiency, connections between the application servers and the standby databases are pre-established so that no new connection establishment is needed. The standby database 120-2 can be automatically switched. The database 120-2, having assumed the role as the primary database, is now read/write accessible by applications 124 (as shown by the line 316 in FIG. 5 that extends between the application server 124 and database 120-2), and is now also in a Data Guard replication configuration with the primary database 120-1 of the DR site 140 (as shown by the double-ended arrow in FIG. 5 that extends between database 120-2 of the primary site 110 and primary database 120-1 of the DR site 140).

As such, prior to automatically initiating the failover processing sequence, the database health monitoring module 232 (FIG. 2) determines (at 312) whether the primary database 120-1 at the primary site has recovered within a permitted recovery time. If the primary database 120-1 at the primary site 110 has not recovered within the recovery time, then at 316, the database failover module 238 (FIG. 2) automatically initiates the failover processing sequence. The database failover module 238 (FIG. 2) will automatically provision a replica of the primary database 120-1 by assigning the standby database 120-2 of the primary site 110 the role as the primary database or "new" primary database meaning that this standby database 120-2 will assume the role of primary database at the primary site 110. In this example, it assumed that the database failover module 238 (FIG. 2) selected standby database 120-2 to assume the role as the primary database of primary site 110, and therefore the applications 124 will be switched to database 120-2 as the primary database for the primary site 110. As a result, the applications served by application servers 124 will be provided with full access to the "new" primary database 120-2 including permission to perform read/write transactions at the new primary database 120-2. As such, the applications 124 can continue read data from the new primary database 120-2, and can also write data to the new primary database 120-2.

Figure 6:
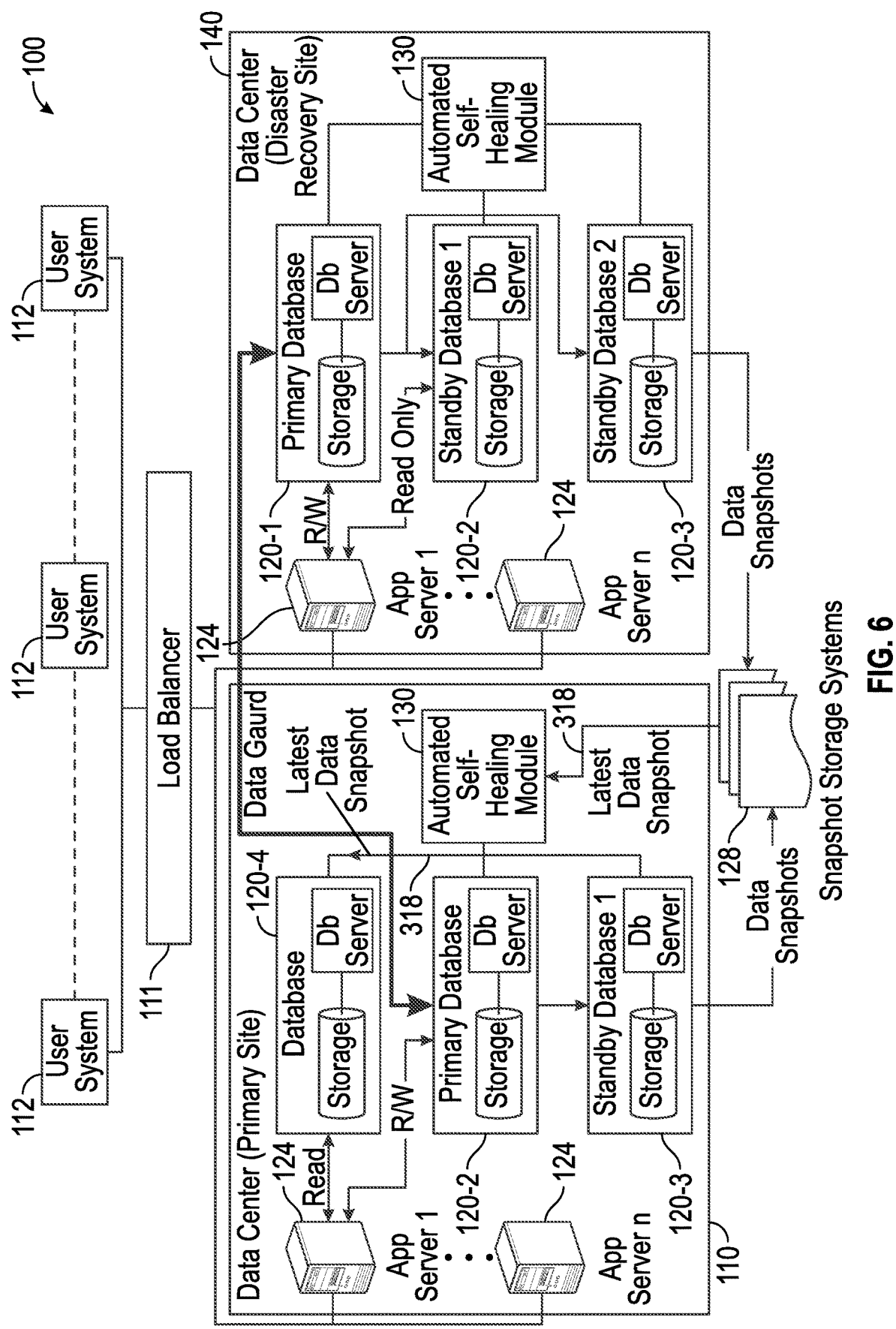
Figure 7:
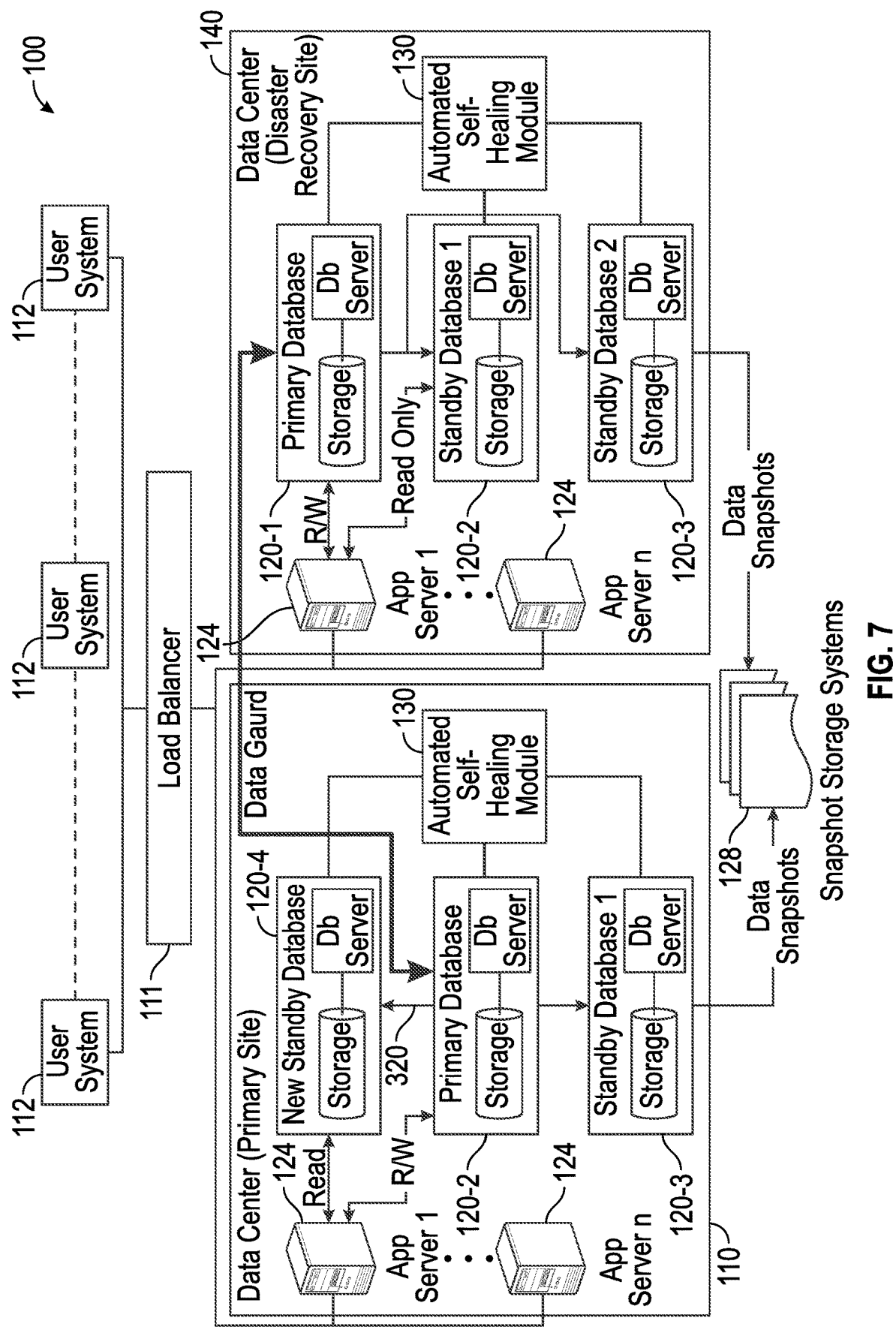

As part of the failover processing sequence, at 318 of FIG. 3B, the standby database provisioning module 240 (FIG. 2) can automatically create a new database 120-4 using the most recent snapshot data that is stored at the snapshot storage systems 128, as illustrated by line 318 of FIG. 6.

The database replication management module 242 (FIG. 2) can then automatically add (at 320) the newly created database 120-4 as a standby database of the primary site 110 so that the system is restored to its full capacity including high availability and standby capacity. This is shown by the double-ended arrow 320 in FIG. 7 that extends between the new standby database 120-4 of the primary site 110 and the primary database 120-2 of the primary site 110.

The following description is of one example of a system in which the features described above may be implemented. The components of the system described below are merely one example and should not be construed as limiting. The features described above with respect to FIGS. 1-7 may be implemented in other types of computing environments, such as one with multiple databases, a multi-tenant database system environment, a single-tenant database system environment, or some combination of the above.

Figure 8:
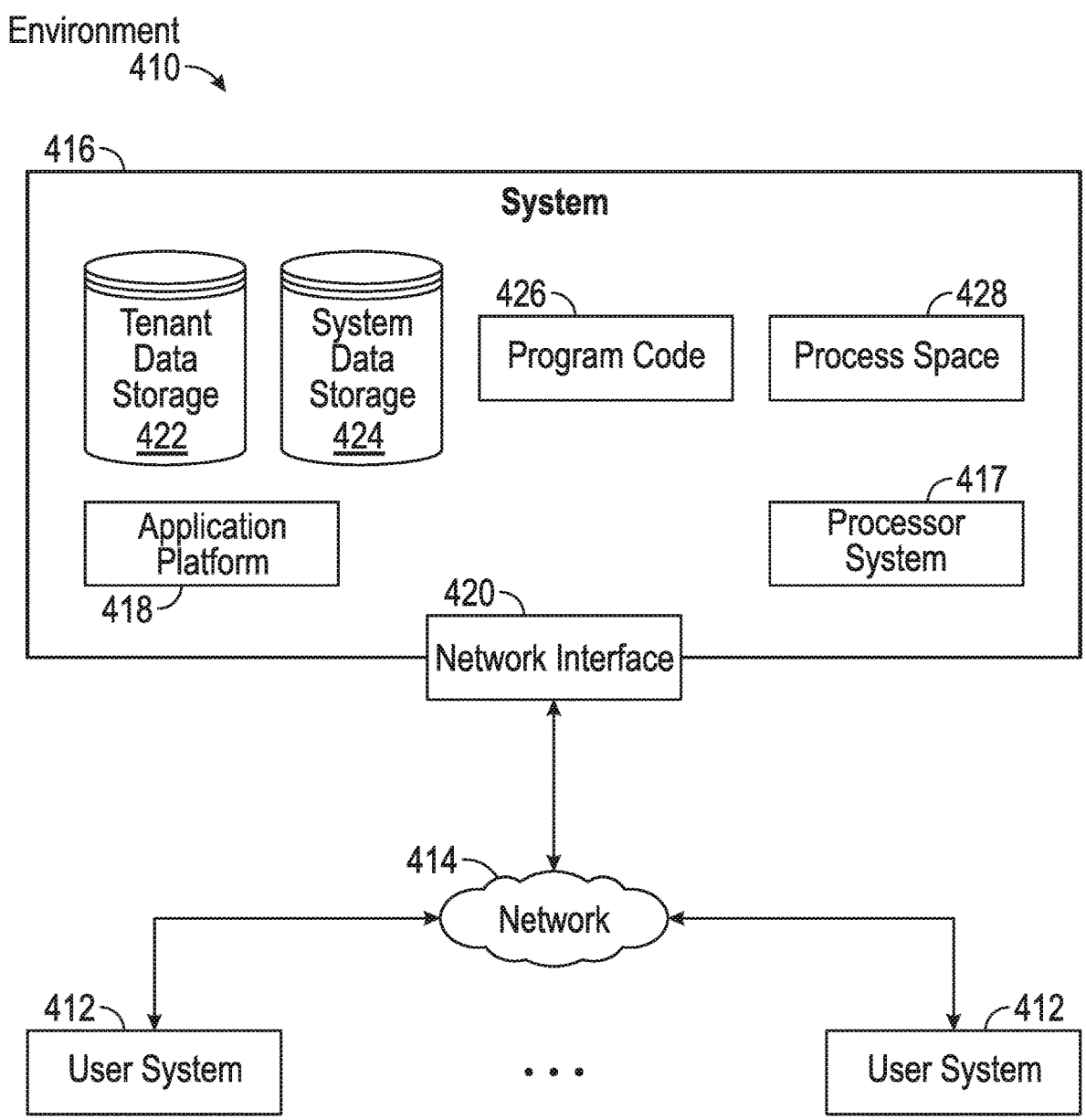
FIG. 8 shows a block diagram of an example of an environment in which an on-demand database service can be used in accordance with some implementations.

FIG. 8 shows a block diagram of an example of an environment 410 in which an on-demand database service can be used in accordance with some implementations. The environment 410 includes user systems 412, a network 414, a database system 416 (also referred to herein as a "cloud-based system"), a processor system 417, an application platform 418, a network interface 420, tenant database 422 for storing tenant data 423, system database 424 for storing system data 425, program code 426 for implementing various functions of the system 416, and process space 428 for executing database system processes and tenant-specific processes, such as running applications as part of an application hosting service. In some other implementations, environment 410 may not have all of these components or systems, or may have other components or systems instead of, or in addition to, those listed above.

In some implementations, the environment 410 is an environment in which an on-demand database service exists. An on-demand database service, such as that which can be implemented using the system 416, is a service that is made available to users outside of the enterprise(s) that own, maintain or provide access to the system 416. As described above, such users generally do not need to be concerned with building or maintaining the system 416. Instead, resources provided by the system 416 may be available for such users' use when the users need services provided by the system 416; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 418 can be a framework that allows the applications of system 416 to execute, such as the hardware or software infrastructure of the system 416. In some implementations, the application platform 418 enables the creation, management and execution of one or more applications developed by the provider of the on-demand database service, users accessing the on-demand database service via user systems 412, or third party application developers accessing the on-demand database service via user systems 412.

In some implementations, the system 416 implements a web-based customer relationship management (CRM) system. For example, in some such implementations, the system 416 includes application servers configured to implement and execute CRM software applications as well as provide related data, code, forms, renderable web pages and documents and other information to and from user systems 412 and to store to, and retrieve from, a database system related data, objects, and Web page content. In some MTS implementations, data for multiple tenants may be stored in the same physical database object in tenant database 422. In some such implementations, tenant data is arranged in the storage medium(s) of tenant database 422 so that data of one tenant is kept logically separate from that of other tenants so that one tenant does not have access to another tenant's data, unless such data is expressly shared. The system 416 also implements applications other than, or in addition to, a CRM application. For example, the system 416 can provide tenant access to multiple hosted (standard and custom) applications, including a CRM application. User (or third party developer) applications, which may or may not include CRM, may be supported by the application platform 418. The application platform 418 manages the creation and storage of the applications into one or more database objects and the execution of the applications in one or more virtual machines in the process space of the system 416.

According to some implementations, each system 416 is configured to provide web pages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 414 can be or include any network or combination of networks of systems or devices that communicate with one another. For example, the network 414 can be or include any one or any combination of a LAN (local area network), WAN (wide area network), telephone network, wireless network, cellular network, point-to-point network, star network, token ring network, hub network, or other appropriate configuration. The network 414 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 412 can communicate with system 416 using TCP/IP and, at a higher network level, other common Internet protocols to communicate, such as HTTP, FTP, AFS, WAP, etc. In an example where HTTP is used, each user system 412 can include an HTTP client commonly referred to as a "web browser" or simply a "browser" for sending and receiving HTTP signals to and from an HTTP server of the system 416. Such an HTTP server can be implemented as the sole network interface 420 between the system 416 and the network 414, but other techniques can be used in addition to or instead of these techniques. In some implementations, the network interface 420 between the system 416 and the network 414 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 412 can be implemented as any computing device(s) or other data processing apparatus or systems usable by users to access the database system 416. For example, any of user systems 412 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 412 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 416) of the user system 412 to access, process and view information, pages and applications available to it from the system 416 over the network 414.

Each user system 412 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 412 in conjunction with pages, forms, applications and other information provided by the system 416 or other systems or servers. For example, the user interface device can be used to access data and applications hosted by system 416, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 412 may differ in their respective capacities, and the capacity of a particular user system 412 can be entirely determined by permissions (permission levels) for the current user of such user system. For example, where a salesperson is using a particular user system 412 to interact with the system 416, that user system can have the capacities allotted to the salesperson. However, while an administrator is using that user system 412 to interact with the system 416, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 412 and some or all of its components are operator-configurable using applications, such as a browser, including computer code executed using a central processing unit (CPU) such as an Intel Pentium® processor or the like. Similarly, the system 416 (and additional instances of an MTS, where more than one is present) and all of its components can be operator-configurable using application(s) including computer code to run using the processor system 417, which may be implemented to include a CPU, which may include an Intel Pentium® processor or the like, or multiple CPUs.

The system 416 includes tangible computer-readable media having non-transitory instructions stored thereon/in that are executable by or used to program a server or other computing system (or collection of such servers or computing systems) to perform some of the implementation of processes described herein. For example, computer program code 426 can implement instructions for operating and configuring the system 416 to intercommunicate and to process web pages, applications and other data and media content as described herein. In some implementations, the computer code 426 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 9:
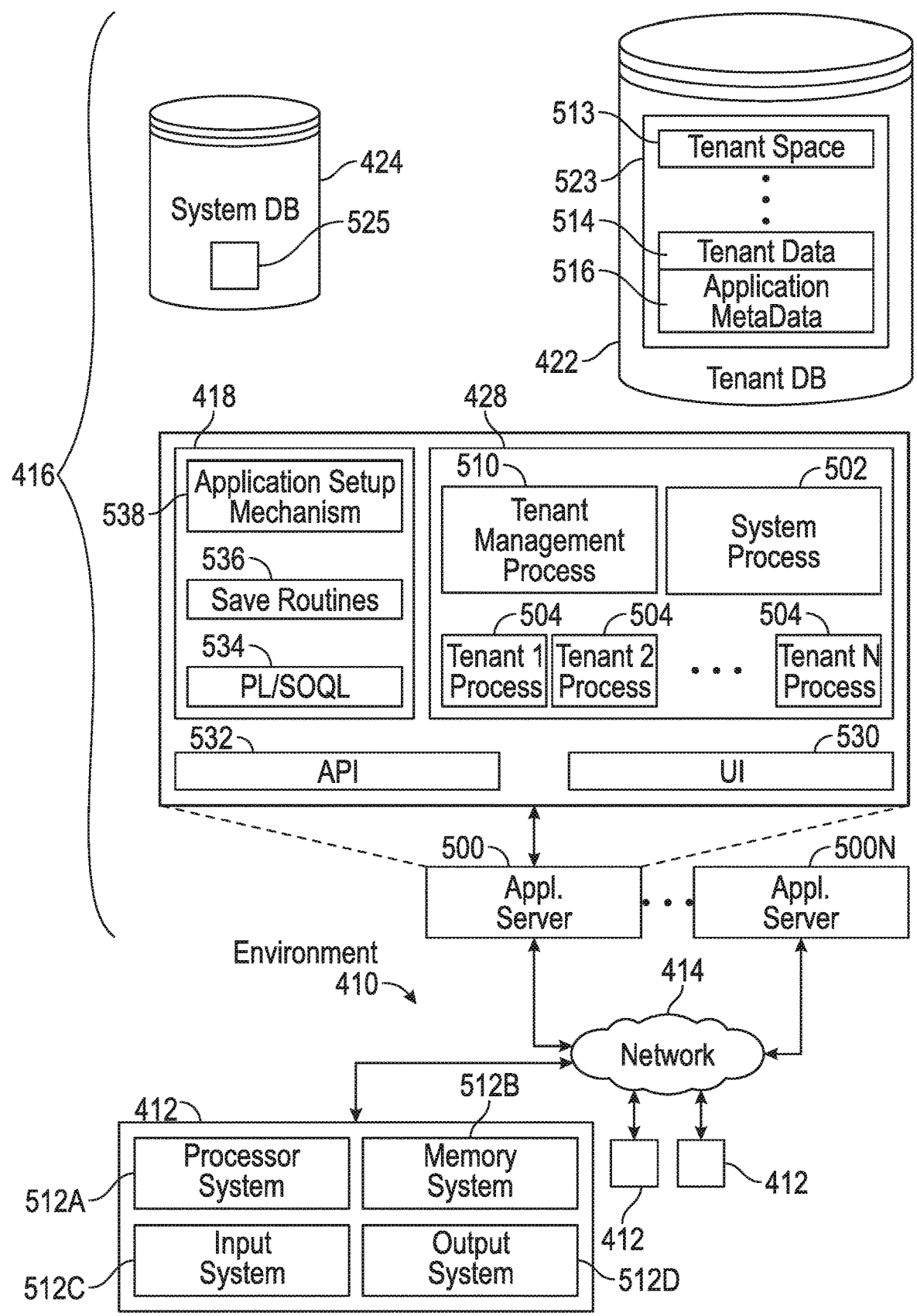
FIG. 9 shows a block diagram of example implementations of elements of FIG. 8 and example interconnections between these elements according to some implementations.

FIG. 9 shows a block diagram of example implementations of elements of FIG. 8 and example interconnections between these elements according to some implementations. That is, FIG. 9 also illustrates environment 410, but FIG. 9, various elements of the system 416 and various interconnections between such elements are shown with more specificity according to some more specific implementations. Elements from FIG. 8 that are also shown in FIG. 9 will use the same reference numbers in FIG. 9 as were used in FIG. 8. Additionally, in FIG. 9, the user system 412 includes a processor system 512A, a memory system 512B, an input system 512C, and an output system 512D. The processor system 512A can include any suitable combination of one or more processors. The memory system 512B can include any suitable combination of one or more memory devices. The input system 512C can include any suitable combination of input devices, such as one or more touchscreen interfaces, keyboards, mice, trackballs, scanners, cameras, or interfaces to networks. The output system 512D can include any suitable combination of output devices, such as one or more display devices, printers, or interfaces to networks.

In FIG. 9, the network interface 420 of FIG. 8 is implemented as a set of HTTP application servers 5001-500N. Each application server 500, also referred to herein as an "app server," is configured to communicate with tenant database 422 and the tenant data 523 therein, as well as system database 424 and the system data 525 therein, to serve requests received from the user systems 512. The tenant data 523 can be divided into individual tenant storage spaces 513, which can be physically or logically arranged or divided. Within each tenant storage space 513, tenant data 514 and application metadata 516 can similarly be allocated for each user. For example, a copy of a user's most recently used (MRU) items can be stored to user storage 514. Similarly, a copy of MRU items for an entire organization that is a tenant can be stored to tenant storage space 513.

The process space 428 includes system process space 502, individual tenant process spaces 504 and a tenant management process space 510. The application platform 418 includes an application setup mechanism 538 that supports application developers' creation and management of applications. Such applications and others can be saved as metadata into tenant database 422 by save routines 536 for execution by subscribers as one or more tenant process spaces 504 managed by tenant management process 510, for example. Invocations to such applications can be coded using PL/SOQL 534, which provides a programming language style interface extension to API 532. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 416 for the subscriber making the invocation and executing the metadata as an application in a virtual machine.

The system 416 of FIG. 9 also includes a user interface (UI) 530 and an application programming interface (API) 532 to system 416 resident processes to users or developers at user systems 512. In some other implementations, the environment 410 may not have the same elements as those listed above or may have other elements instead of, or in addition to, those listed above.

Each application server 500 can be communicably coupled with tenant database 422 and system database 424, for example, having access to tenant data 523 and system data 525, respectively, via a different network connection. For example, one application server 500₁ can be coupled via the network 414 (for example, the Internet), another application server 500N can be coupled via a direct network link, and another application server (not illustrated) can be coupled by yet a different network connection. Transfer Control Protocol and Internet Protocol (TCP/IP) are examples of typical protocols that can be used for communicating between application servers 500 and the system 416. However, it will be apparent to one skilled in the art that other transport protocols can be used to optimize the system 416 depending on the network interconnections used.

In some implementations, each application server 500 is configured to handle requests for any user associated with any organization that is a tenant of the system 416. Because it can be desirable to be able to add and remove application servers 500 from the server pool at any time and for various reasons, in some implementations there is no server affinity for a user or organization to a specific application server 500. In some such implementations, an interface system implementing a load balancing function (for example, an F5 Big-IP load balancer) is communicably coupled between the application servers 500 and the user systems 512 to distribute requests to the application servers 500. In one implementation, the load balancer uses a least-connections algorithm to route user requests to the application servers 500. Other examples of load balancing algorithms, such as round robin and observed-response-time, also can be used. For example, in some instances, three consecutive requests from the same user could hit three different application servers 500, and three requests from different users could hit the same application server 500. In this manner, by way of example, system 416 can be a multi-tenant system in which system 416 handles storage of, and access to, different objects, data and applications across disparate users and organizations.

In one example storage use case, one tenant can be a company that employs a sales force where each salesperson uses system 416 to manage aspects of their sales. A user can maintain contact data, leads data, customer follow-up data, performance data, goals and progress data, etc., all applicable to that user's personal sales process (for example, in tenant database 422). In an example of a MTS arrangement, because all of the data and the applications to access, view, modify, report, transmit, calculate, etc., can be maintained and accessed by a user system 512 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 416 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 416 also can maintain system level data usable by multiple tenants or other data. Such system level data can include industry reports, news, postings, and the like that are sharable among tenants.

In some implementations, the user systems 512 (which also can be client systems) communicate with the application servers 500 to request and update system-level and tenant-level data from the system 416. Such requests and updates can involve sending one or more queries to tenant database 422 or system database 424. The system 416 (for example, an application server 500 in the system 416) can automatically generate one or more SQL statements (for example, one or more SQL queries) designed to access the desired information. System database 424 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 10A:
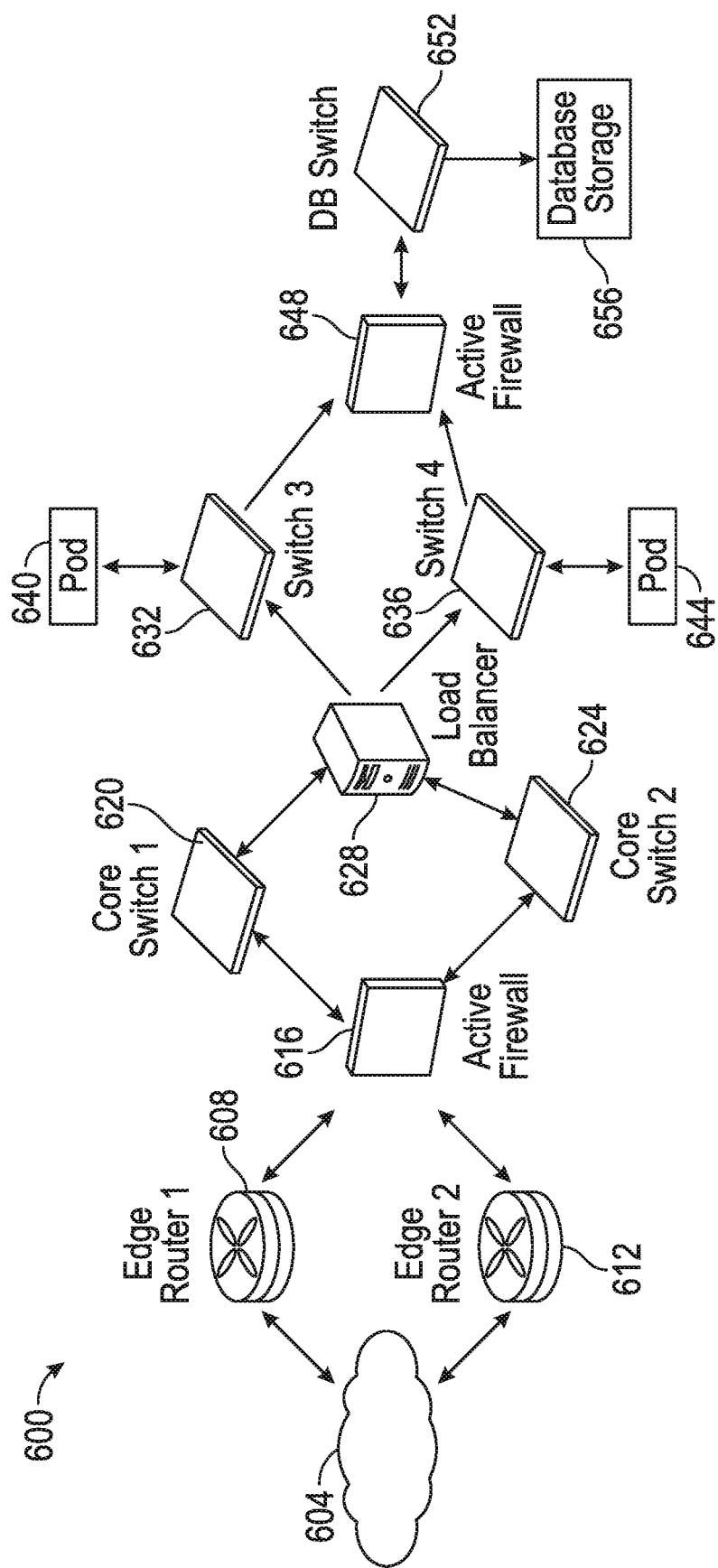
FIG. 10A shows a system diagram illustrating example architectural components of an on-demand database service environment according to some implementations.

FIG. 10A shows a system diagram illustrating example architectural components of an on-demand database service environment 600 according to some implementations. A client machine communicably connected with the cloud 604, generally referring to one or more networks in combination, as described herein, can communicate with the on-demand database service environment 600 via one or more edge routers 608 and 612. A client machine can be any of the examples of user systems 12 described above. The edge routers can communicate with one or more core switches 620 and 624 through a firewall 616. The core switches can communicate with a load balancer 628, which can distribute server load over different pods, such as the pods 640 and 644. The pods 640 and 644, which can each include one or more servers or other computing resources, can perform data processing and other operations used to provide on-demand services. Communication with the pods can be conducted via pod switches 632 and 636. Components of the on-demand database service environment can communicate with database storage 656 through a database firewall 648 and a database switch 652.

Figure 10B:
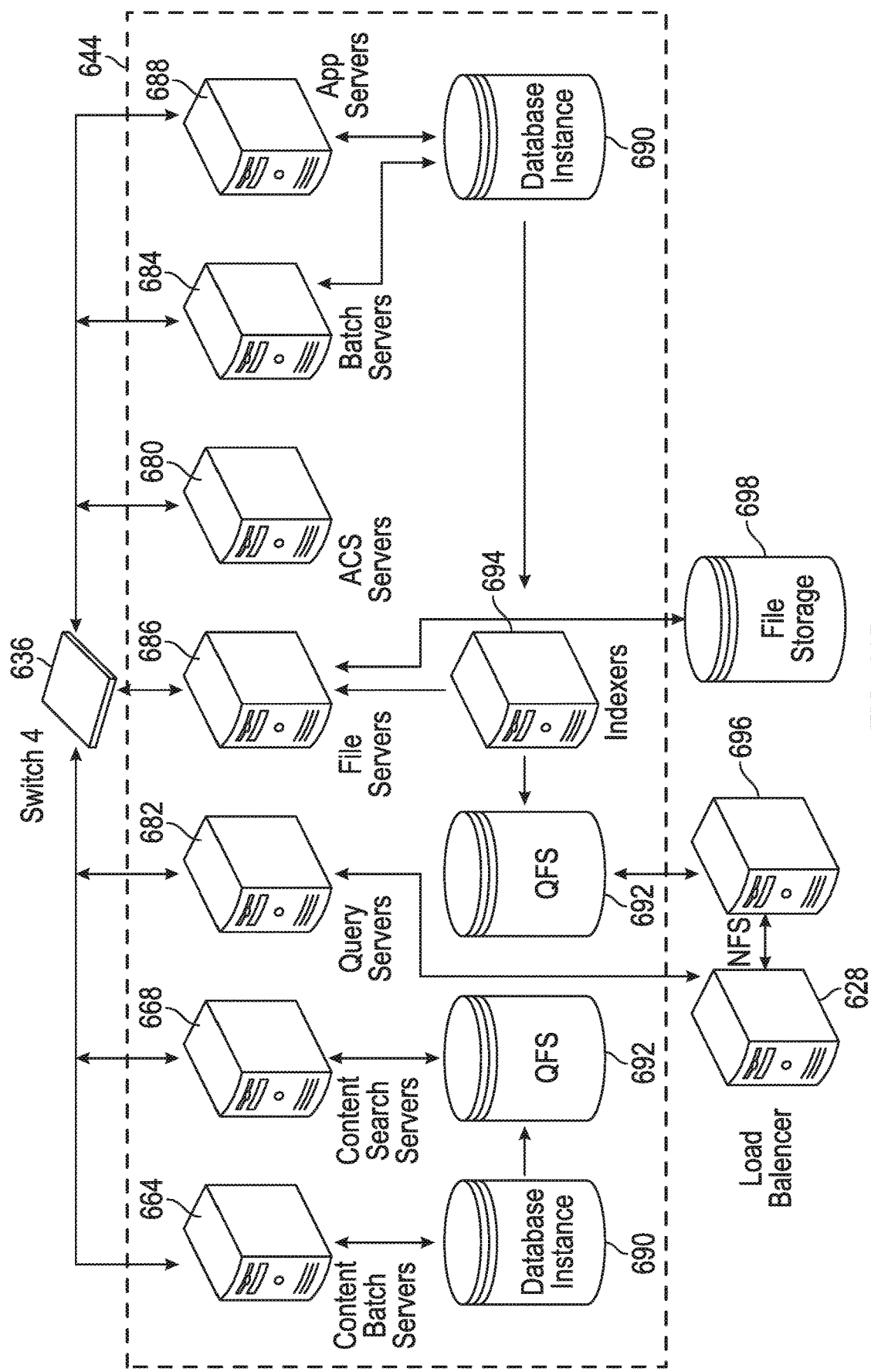
FIG. 10B shows a system diagram further illustrating example architectural components of an on-demand database service environment according to some implementations.

As shown in FIGS. 10A and 10B, accessing an on-demand database service environment can involve communications transmitted among a variety of different hardware or software components. Further, the on-demand database service environment 600 is a simplified representation of an actual on-demand database service environment. For example, while only one or two devices of each type are shown in FIGS. 10A and 10B, some implementations of an on-demand database service environment can include anywhere from one to several devices of each type. Also, the on-demand database service environment need not include each device shown in FIGS. 10A and 10B, or can include additional devices not shown in FIGS. 10A and 10B.

Additionally, it should be appreciated that one or more of the devices in the on-demand database service environment 600 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 604 is intended to refer to a data network or multiple data networks, often including the Internet. Client machines communicably connected with the cloud 604 can communicate with other components of the on-demand database service environment 600 to access services provided by the on-demand database service environment. For example, client machines can access the on-demand database service environment to retrieve, store, edit, or process information. In some implementations, the edge routers 608 and 612 route packets between the cloud 604 and other components of the on-demand database service environment 600. For example, the edge routers 608 and 612 can employ the Border Gateway Protocol (BGP). The BGP is the core routing protocol of the Internet. The edge routers 608 and 612 can maintain a table of IP networks or 'prefixes', which designate network reachability among autonomous systems on the Internet.

In some implementations, the firewall 616 can protect the inner components of the on-demand database service environment 600 from Internet traffic. The firewall 616 can block, permit, or deny access to the inner components of the on-demand database service environment 600 based upon a set of rules and other criteria. The firewall 616 can act as one or more of a packet filter, an application gateway, a stateful filter, a proxy server, or any other type of firewall.

In some implementations, the core switches 620 and 624 are high-capacity switches that transfer packets within the on-demand database service environment 600. The core switches 620 and 624 can be configured as network bridges that quickly route data between different components within the on-demand database service environment. In some implementations, the use of two or more core switches 620 and 624 can provide redundancy or reduced latency.

In some implementations, the pods 640 and 644 perform the core data processing and service functions provided by the on-demand database service environment. Each pod can include various types of hardware or software computing resources. An example of the pod architecture is discussed in greater detail with reference to FIG. 10B. In some implementations, communication between the pods 640 and 644 is conducted via the pod switches 632 and 636. The pod switches 632 and 636 can facilitate communication between the pods 640 and 644 and client machines communicably connected with the cloud 604, for example via core switches 620 and 624. Also, the pod switches 632 and 636 may facilitate communication between the pods 640 and 644 and the database storage 656. In some implementations, the load balancer 628 can distribute workload between the pods 640 and 644. Balancing the on-demand service requests between the pods can assist in improving the use of resources, increasing throughput, reducing response times, or reducing overhead. The load balancer 628 may include multilayer switches to analyze and forward traffic.

In some implementations, access to the database storage 656 is guarded by a database firewall 648. The database firewall 648 can act as a computer application firewall operating at the database application layer of a protocol stack. The database firewall 648 can protect the database storage 656 from application attacks such as structure query language (SQL) injection, database rootkits, and unauthorized information disclosure. In some implementations, the database firewall 648 includes a host using one or more forms of reverse proxy services to proxy traffic before passing it to a gateway router. The database firewall 648 can inspect the contents of database traffic and block certain content or database requests. The database firewall 648 can work on the SQL application level atop the TCP/IP stack, managing applications' connection to the database or SQL management interfaces as well as intercepting and enforcing packets traveling to or from a database network or application interface.

In some implementations, communication with the database storage 656 is conducted via the database switch 652. The multi-tenant database storage 656 can include more than one hardware or software components for handling database queries. Accordingly, the database switch 652 can direct database queries transmitted by other components of the on-demand database service environment (for example, the pods 640 and 644) to the correct components within the database storage 656. In some implementations, the database storage 656 is an on-demand database system shared by many different organizations as described above with reference to FIG. 8 and FIG. 9.

FIG. 10B shows a system diagram further illustrating example architectural components of an on-demand database service environment according to some implementations. The pod 644 can be used to render services to a user of the on-demand database service environment 600. In some implementations, each pod includes a variety of servers or other systems. The pod 644 includes one or more content batch servers 664, content search servers 668, query servers 682, file force servers 686, access control system (ACS) servers 680, batch servers 684, and app servers 688. The pod 644 also can include database instances 690, quick file systems (QFS) 692, and indexers 694. In some implementations, some or all communication between the servers in the pod 644 can be transmitted via the switch 636.

In some implementations, the app servers 688 include a hardware or software framework dedicated to the execution of procedures (for example, programs, routines, scripts) for supporting the construction of applications provided by the on-demand database service environment 600 via the pod 644. In some implementations, the hardware or software framework of an app server 688 is configured to execute operations of the services described herein, including performance of the blocks of various methods or processes described herein. In some alternative implementations, two or more app servers 688 can be included and cooperate to perform such methods, or one or more other servers described herein can be configured to perform the disclosed methods.

The content batch servers 664 can handle requests internal to the pod. Some such requests can be long-running or not tied to a particular customer. For example, the content batch servers 664 can handle requests related to log mining, cleanup work, and maintenance tasks. The content search servers 668 can provide query and indexer functions. For example, the functions provided by the content search servers 668 can allow users to search through content stored in the on-demand database service environment. The file force servers 686 can manage requests for information stored in the File force storage 698. The File force storage 698 can store information such as documents, images, and basic large objects (BLOBs). By managing requests for information using the file force servers 686, the image footprint on the database can be reduced. The query servers 682 can be used to retrieve information from one or more file storage systems. For example, the query system 682 can receive requests for information from the app servers 688 and transmit information queries to the NFS 696 located outside the pod.

The pod 644 can share a database instance 690 configured as a multi-tenant environment in which different organizations share access to the same database. Additionally, services rendered by the pod 644 may call upon various hardware or software resources. In some implementations, the ACS servers 680 control access to data, hardware resources, or software resources. In some implementations, the batch servers 684 process batch jobs, which are used to run tasks at specified times. For example, the batch servers 684 can transmit instructions to other servers, such as the app servers 688, to trigger the batch jobs.

In some implementations, the QFS 692 is an open source file storage system available from Sun Microsystems® of Santa Clara, Calif. The QFS can serve as a rapid-access file storage system for storing and accessing information available within the pod 644. The QFS 692 can support some volume management capabilities, allowing many disks to be grouped together into a file storage system. File storage system metadata can be kept on a separate set of disks, which can be useful for streaming applications where long disk seeks cannot be tolerated. Thus, the QFS system can communicate with one or more content search servers 668 or indexers 694 to identify, retrieve, move, or update data stored in the network file storage systems 696 or other storage systems.

In some implementations, one or more query servers 682 communicate with the NFS 696 to retrieve or update information stored outside of the pod 644. The NFS 696 can allow servers located in the pod 644 to access information to access files over a network in a manner similar to how local storage is accessed. In some implementations, queries from the query servers 682 are transmitted to the NFS 696 via the load balancer 628, which can distribute resource requests over various resources available in the on-demand database service environment. The NFS 696 also can communicate with the QFS 692 to update the information stored on the NFS 696 or to provide information to the QFS 692 for use by servers located within the pod 644.

In some implementations, the pod includes one or more database instances 690. The database instance 690 can transmit information to the QFS 692. When information is transmitted to the QFS, it can be available for use by servers within the pod 644 without using an additional database call. In some implementations, database information is transmitted to the indexer 694. Indexer 694 can provide an index of information available in the database 690 or QFS 692. The index information can be provided to file force servers 686 or the QFS 692.

Figure 11:
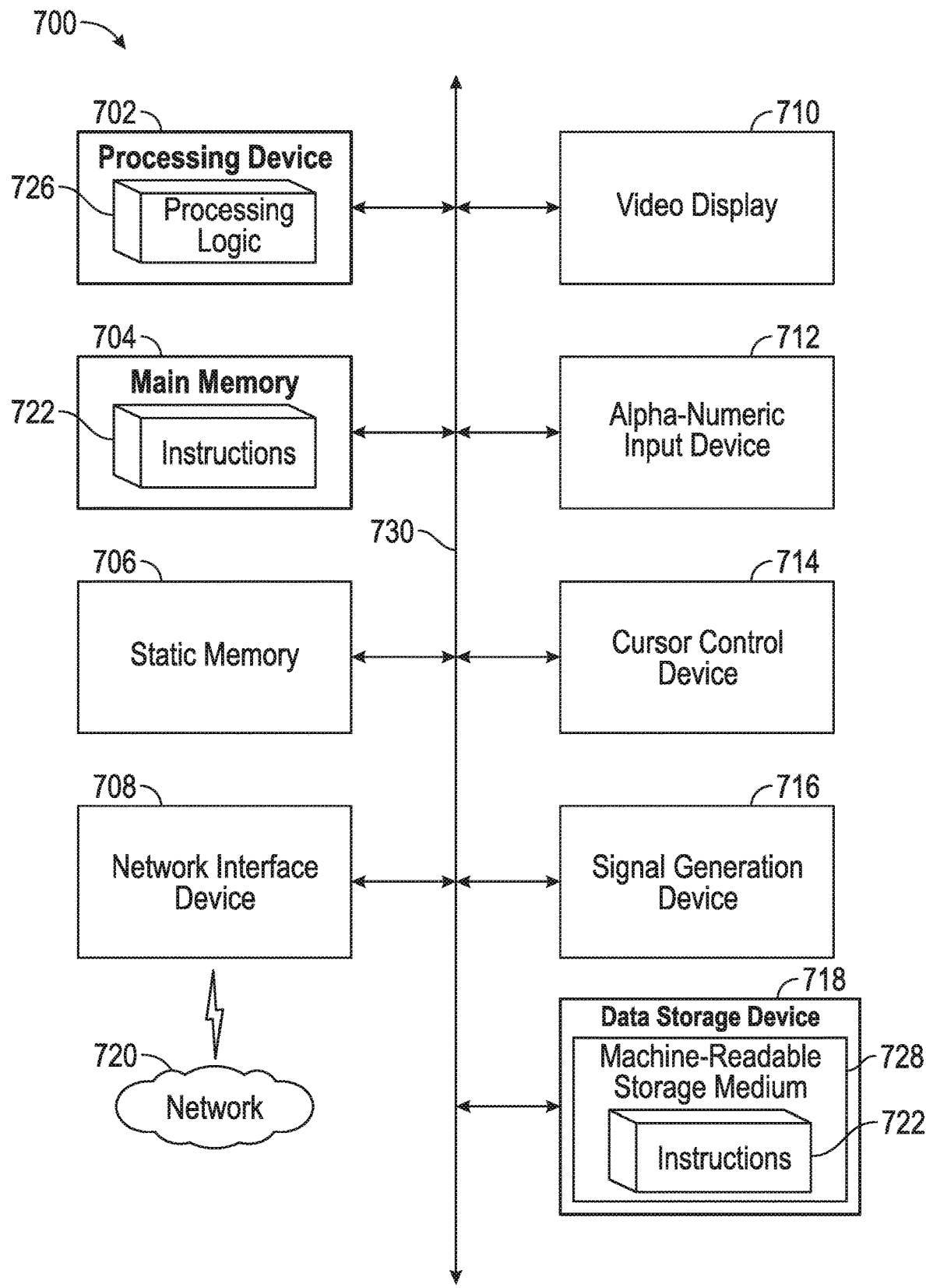
FIG. 11 illustrates a diagrammatic representation of a machine in the exemplary form of a computer system within which a set of instructions, for causing the machine to perform any one or more of the methodologies discussed herein, may be executed.

FIG. 11 illustrates a diagrammatic representation of a machine in the exemplary form of a computer system 700 within which a set of instructions, for causing the machine to perform any one or more of the methodologies discussed herein, may be executed. The system 700 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device (processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 718, which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a computer-readable medium 728 on which is stored one or more sets of instructions 722 (e.g., instructions of in-memory buffer service 74) embodying any one or more of the methodologies or functions described herein. The instructions 722 may also reside, completely or at least partially, within the main memory 704 and/or within processing logic 726 of the processing device 702 during execution thereof by the computer system 700, the main memory 704 and the processing device 702 also constituting computer-readable media. The instructions may further be transmitted or received over a network 720 via the network interface device 708.

While the computer-readable storage medium 728 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "identifying," "adding," "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method in a database system comprising a primary site, wherein the primary site further comprises an application server that writes data to a primary database and reads data from the primary database when the primary database is available, the method comprising: periodically capturing snapshots of data stored at a standby database that is a replica of the primary database; storing the snapshots of data in a snapshot storage system comprising separate storage hardware that is not implemented at the primary site; automatically detecting, by a self-healing module, unavailability of the primary database;
- determining, by the self-healing module, whether the standby database of the primary site is available; and automatically initiating a failover processing sequence by the self-healing module when the self-healing module detects that the primary database is unavailable and determines that the standby database is available, wherein the failover processing sequence comprises: automatically enabling the standby database as readable and writable and assigning the standby database the role of primary database at the primary site to start replicating data to other standby databases; after a failover role transition, using a pre-established connection between the application server and the standby database to allow the application server to read data from the standby database and to write data to the standby database resulting in the standby database assuming role of the primary database at the primary site; and automatically creating a new database using most recent snapshot data from the primary database that is stored at the snapshot storage system.

2. The method according to claim 1, wherein the standby database is a first standby database.

3. The method according to claim 2, wherein the failover processing sequence further comprises:
- automatically adding, at the self-healing module, the new database as a second standby database at the primary site to restore fully capacity.

4. The method according to claim 1, wherein the primary database is a first primary database, and wherein the database system further comprises a disaster recover site comprising a second primary database, and the method further comprising:
- directing, via a load balancer, traffic from user systems to an application server at the disaster recovery site that has access to the second primary database when all of the databases of the primary site have failed and no standby databases are available at the primary site.

5. The method according to claim 1, further comprising:
- temporarily allowing the application server to have read-only access from the standby database at the primary site when the self-healing module determines that the standby database is available at the primary site so that the application server can still read data from the standby database and satisfy read-only requests while the primary database is down and it is being determined whether the primary database will recover.

6. The method according to claim 5, further comprising:
- determining, at the self-healing module prior to automatically initiating the failover processing sequence, whether the primary database at the primary site has recovered within a recovery time when the self-healing module determines that the standby database is available at the primary site; and
- automatically initiating, at the self-healing module, the failover processing sequence when the primary database at the primary site has not recovered within the recovery time.

7. The method according to claim 6, further comprising:
- automatically re-starting the primary database when the self-healing module determines that the primary database at the primary site has recovered within the recovery time, wherein applications at the application server continue to use the primary database from the primary site as the primary database.

8. The method according to claim 1, wherein the primary database comprises a first database server and a first storage sub-system, and wherein the standby database comprises a second database server and a second storage sub-system, and further comprising:
- before automatically enabling the standby database, automatically attaching the first storage sub-system from the first database server to the second database server for recovery.

9. A computing system comprising a processor and a memory, wherein the memory comprises computer-executable instructions that are capable of causing the computing system to: periodically capture snapshots of data stored at a standby database that is a replica of the primary database; store the snapshots of data in a snapshot storage system comprising separate storage hardware that is not implemented at the primary site; automatically detect unavailability of a primary database at a primary site, wherein the primary site further comprises an application server that writes data to the primary database and reads data from the primary database when the primary database is available; determine whether the standby database is still available at the primary site; and automatically initiate a failover processing sequence when the primary database has been detected to be unavailable and the standby database has been determined to be available, wherein the failover processing sequence comprises: automatically enabling the standby database as readable and writable and assigning the standby database the role of primary database at the primary site to start replicating data to other standby databases; after a failover role transition, using a pre-established connection between the application server and the standby database to allow the application server to read data from the standby database and to write data to the standby database resulting in the standby database assuming role of the primary database at the primary site; and automatically create a new database using most recent snapshot data from the primary database that is stored at a snapshot storage system.

10. The computing system of claim 9, wherein the standby database is a first standby database, and wherein the computer-executable instructions are further capable of causing the computing system to: automatically add the new database as a second standby database at the primary site to restore fully capacity.

11. The computing system of claim 9, wherein the computer-executable instructions are further capable of causing the computing system to:
- temporarily allow the application server to have read-only access from the standby database at the primary site when the standby database is determined to be available at the primary site so that the application server can still read data from the standby database and satisfy read-only requests while the primary database is down and it is being determined whether the primary database will recover, wherein no new connection establishment is needed due to the pre-established connection when the fail over role transition happens.

12. The computing system of claim 9, wherein the primary database comprises a first database server and a first storage sub-system, and wherein the standby database comprises a second database server and a second storage sub-system, and wherein the computer-executable instructions are further capable of causing the computing system to:
- automatically attach the first storage sub-system from the first database server to the second database server for recovery before automatically enabling.

13. An automated self-healing database system, comprising: a primary site, comprising: a primary database; an application server that writes data to the primary database and reads data from the primary database when the primary database is available; a standby database that is a replica of the primary database; a snapshot storage system comprising separate storage hardware that is remotely located and not implemented at the primary site; and a self-healing module configured to: periodically capture snapshots of data stored at the standby database, wherein the snapshot storage system is configured to store the snapshots of data; automatically detect unavailability of the primary database; determine whether the standby database of the primary site is available; and automatically initiate a failover processing sequence when the self-healing module detects that the primary database is unavailable and determines that the standby database of the primary site is available, wherein the failover processing sequence comprises: automatically enabling the standby database as readable and writable and assigning the standby database the role of primary database at the primary site to start replicating data to other standby databases;

and after a failover role transition, using a pre-established connection between the application server and the standby database to allow the application server to read data from the standby database and to write data to the standby database resulting in the standby database assuming role of the primary database at the primary site; automatically creating a new database using most recent snapshot data from the primary database that is stored at a snapshot storage system.

14. The automated self-healing database system according to claim 13, wherein the standby database is a first standby database.

15. The automated self-healing database system according to claim 14, wherein the self-healing module is further configured to, as part of the failover processing sequence, automatically add the new database as a second standby database at the primary site to restore fully capacity.

16. The automated self-healing database system according to claim 13, wherein the primary database is a first primary database, and wherein the automated self-healing database system further comprises:
a load balancer; and
a disaster recover site comprising an application server and a second primary database, and
wherein the load balancer is configured to direct traffic from user systems to the application server at the disaster recover site that has access to the second primary database when all of the databases of the primary site have failed and no standby databases are available at the primary site.

17. The automated self-healing database system according to claim 13, wherein the self-healing module is further configured to: temporarily allow the application server to have read-only access from the standby database at the primary site when the self-healing module determines that the standby database is available at the primary site so that the application server can still read data from the standby database and satisfy read-only requests while the primary database is down and it is being determined whether the primary database will recover, wherein no new connection establishment is needed due to the pre-established connection when the fail over role transition happens.

18. The automated self-healing database system according to claim 17, wherein the self-healing module is further configured to:
determine, prior to automatically initiating the failover processing sequence, whether the primary database at the primary site has recovered within a recovery time when the self-healing module determines that the standby database is available at the primary site; and
automatically initiate the failover processing sequence when the primary database at the primary site has not recovered within the recovery time.

19. The automated self-healing database system according to claim 18, wherein the self-healing module is further configured to:
automatically re-start the primary database when the self-healing module determines that the primary database at the primary site has recovered within the recovery time, wherein applications at the application server continue to use the primary database from the primary site as the primary database.

20. The method according to claim 13, wherein the primary database comprises a first database server and a first storage sub-system, and wherein the standby database comprises a second database server and a second storage sub-system, and
wherein the self-healing module is further configured to:
automatically attach the first storage sub-system from the first database server to the second database server for recovery before automatically enabling the standby database.

* * * * *